Sept. 10, 1940.  L. THIRY  2,214,512
CONNECTION BETWEEN A PROPELLER AND ITS DRIVING SHAFT Filed April 20, 1937  3 Sheets-Sheet 1

Léon Thiry
INVENTOR
By Otto Munk
his ATTY.

Sept. 10, 1940.  L. THIRY  2,214,512
CONNECTION BETWEEN A PROPELLER AND ITS DRIVING SHAFT
Filed April 20, 1937  3 Sheets-Sheet 2
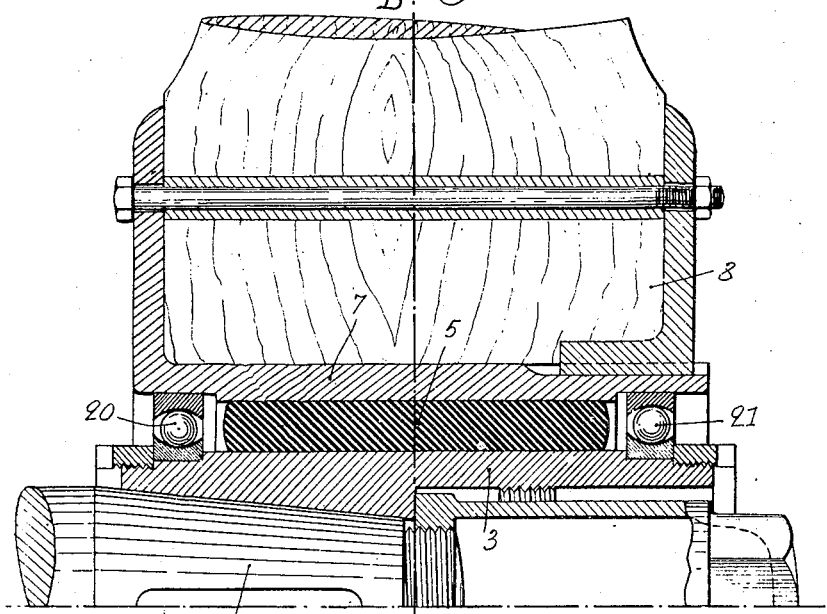
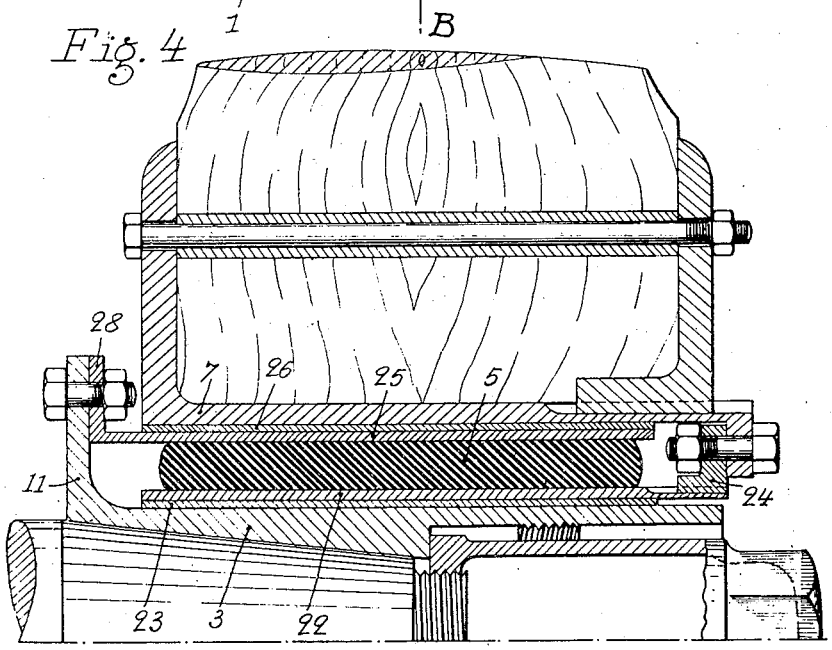
Léon Thiry
INVENTOR
his ATTY Sept. 10, 1940.    L. THIRY    2,214,512
CONNECTION BETWEEN A PROPELLER AND ITS DRIVING SHAFT
Filed April 20, 1937    3 Sheets-Sheet 3
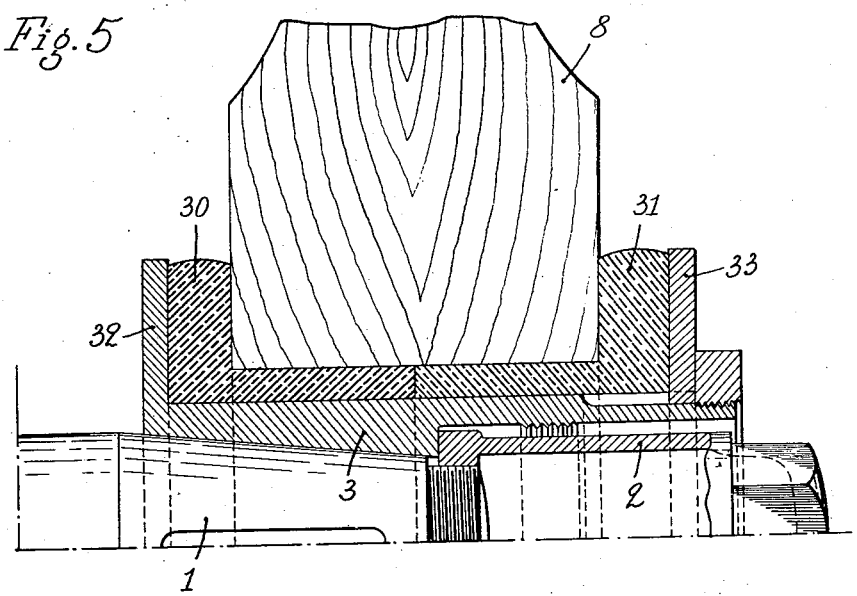
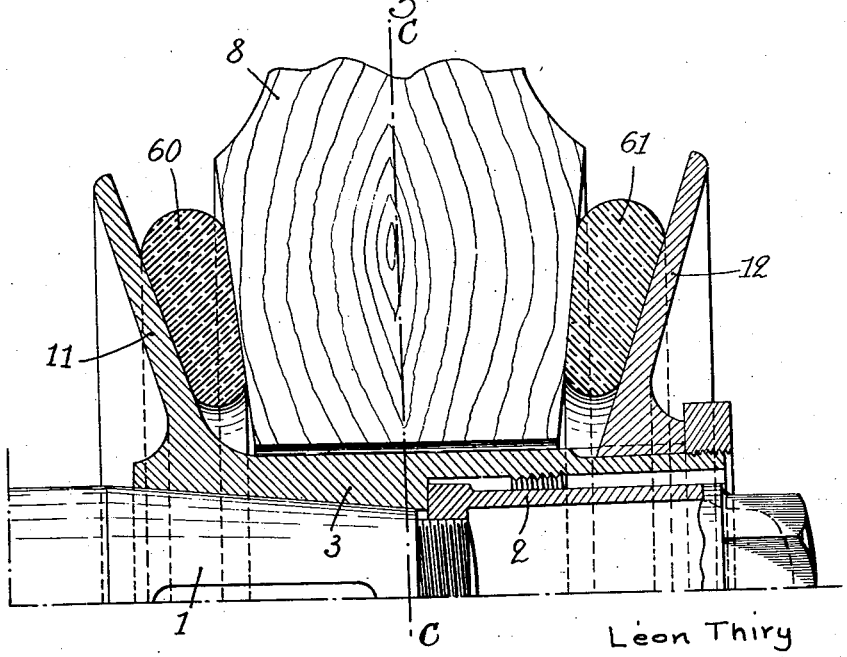
Léon Thiry
INVENTOR
By [signature]
his ATT'Y.

Patented Sept. 10, 1940

2,214,512

UNITED STATES PATENT OFFICE 2,214,512

CONNECTION BETWEEN A PROPELLER AND ITS DRIVING SHAFT

Leon Thiry, Huy, Belgium

Application April 20, 1937, Serial No. 137,967
In France May 7, 1936

5 Claims. (Cl. 170—177)

The device consisting of the driving shaft of a flying machine, a vessel, or the like, and the propeller which is coupled to this shaft, is subjected to torsional as well as vibrations which are produced by the variations of the power torque and the load torque.

One of the consequences of these vibrations is that the movement of the propeller is by no means a uniform movement of rotation, and thus the blades which bear upon the air (or water) will set up a whirling motion in the latter which produces additional resistances to be overcome, and hence a reduction of the possible speed of the machine.

The present invention relates to an improved connection between a propeller of a flying machine, or the like, and its driving shaft, which obviates the aforesaid drawbacks and is chiefly characterized by the fact that between the shaft and the hub of the propeller there is interposed an elastic device which tends to absorb the torsional as well as the axial movements, dissipates their energy, and thus permits of increasing the operating speed of the aircraft or other machine.

The elastic device thus interposed may consist, to advantage, of one or more masses of an elastic substance such as india-rubber, which is more particularly adapted for the dissipation of the energy of the vibrations, owing to its cycle of hysteresis. The said mass or masses may be made to adhere, directly or indirectly, to the shaft and to the propeller by any of the known means such as frictional engagement due to the pressure caused by its deformation, vulc,nisation, cementing, winding in spiral, etc.

The elasticity of the said mass or masses may be allowed its full value in all directions, but it may also, in some cases, be limited to certain preferred directions, for instance in the circular direction, thus obtaining a semi-flexible coupling.

In the accompanying drawings, which are given solely by way of example:

Figs. 3 and 4 are like sections of two other modifications, in the case of a semi-flexible coupling.

Figs. 5 and 6 are like sections of two other embodiments according to the invention.

Figure 1:
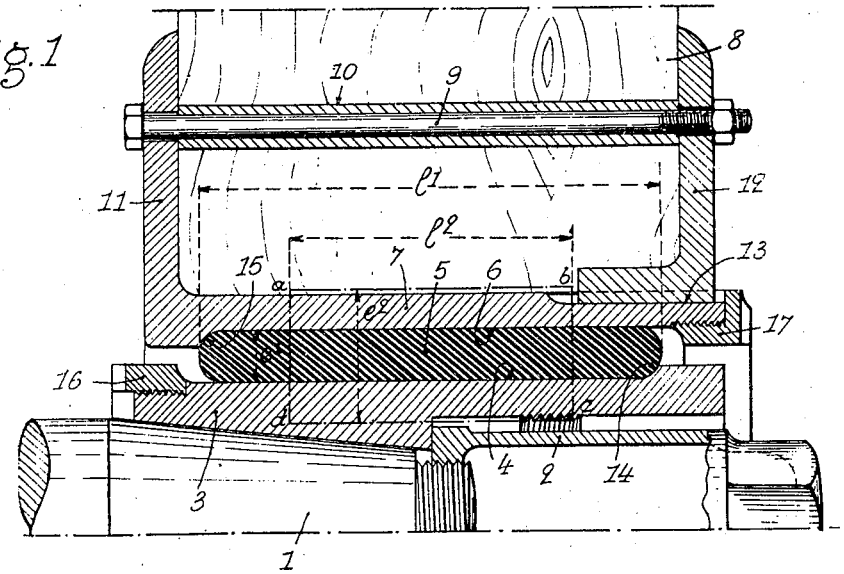
Fig. 1 is a radial section of a connection in accordance with the invention, in the case of a flexible coupling.

In the embodiment shown in Fig. 1, on the tapered end of the shaft 1 is fitted and held by a nut 2 a sleeve 3 whose outer cylindrical surface 4 is coaxial with the shaft 1. To this surface 4 is caused to adhere a ring 5 of rubber or like material. The outer surface of the said ring adheres in like manner to the inner surface 6 of a sleeve 7. To said sleeve 7 is secured the propeller 8, which is represented in all the embodiments as a wooden propeller whose blades are integral with the propeller hub, and for instance by bolts 9 passing through tubular cross-pieces 10 and connecting a lateral flange 11 of the sleeve 7 to a ring 12 which is slidably keyed at 13 to the said sleeve 7.

The adhesion between the elastic mass 5 and the metallic members 3 and 7 is made sufficient in order to provide for the transmission, with the proper margin of safety, of the geratest allowable torque. However, while permitting the rotation of the propeller by the shaft 1 the mass 5 will dampen the torsional vibrations which are due to the variations of the driving torque and the load torque, and the energy of these vibrations is absorbed by the india-rubber or like material, owing to its cycle of hysteresis.

The adhesion of the mass 5 to the members 3 and 7 can be obtained in various ways, for instance by a deformation of the mass of india-rubber, this deformation being manifested by a reduction of its radial thickness.

It is possible, for instance, to utilize an india-rubber ring whose form abcd in the free state is such that its forced insertion between the members 3 and 7 gives rise to a reduction of its radial thickness and to an increase of its length, and this deformation may be accompanied, by a variation of its mean developed length.

The india-rubber ring 5 may further be cemented to at least one of the members 3 and 17.

Preferably, there are provided longitudinal stops 14 and 15 which are formed on the members 3 and 7 in order to resist the force of traction due to the propeller. Other stops 16 and 17 which are separately secured to the members 3 and 7, oppose the stress in the other direction which is set up when the direction of travel is reversed.

Figure 2:
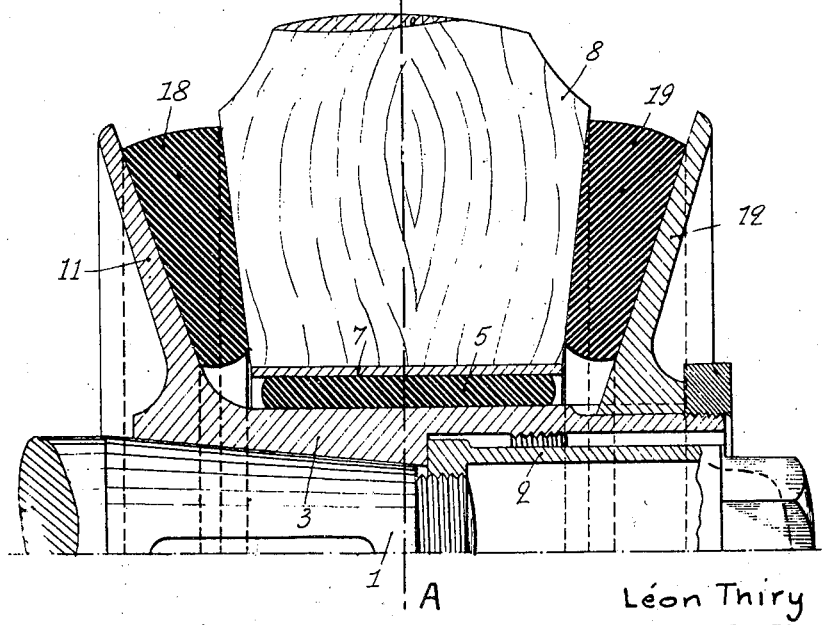
Fig. 2 is a like section of a modification.

Fig. 2 represents a modification, in which, in addition to the mass 5 of india-rubber or like material disposed symmetrically with relation to the median plane A—A of the propeller at right angles to the axis of shaft 1 and propeller 8, there are provided two other masses 18 and 19 having the form of rings of double conical shape, or the like, situated on either side of the propeller 8 between this propeller and the cheeks 11 and 12 and also disposed symmetrically with relation to said median plane A—A.

The apexes of the tapered surfaces of a given mass 18 or 19 preferably coincide at a common point located on the axis of the shaft, although this is not indispensable. The two masses 18 and 19 may even be sufficient to assure the driving, by themselves, and thus the mass 5 may, if necessary, be eliminated or replaced by a needle bearing, a roller bearing, etc.

Fig. 3 represents a modification of the embodiment shown in Fig. 1, in which two ball bearings 20—21 with deep grooves, which together with the rubber ring 5 are disposed symmetrically with relation to the median plane B—B of the propeller at right angles to the axis of shaft 1 and propeller 8, provide for the exact centering and also serve as stops cooperating with the shoulders 34 and 35 on the hub 7 and with the rings 36 and 37 secured to the sleeve 3.

Fig. 4 shows another modification in which the centering is ensured by cylindrical metallic bearing surfaces.

In this construction, the elastic device comprises: an internal sleeve 22 centered on the member 3 by means of a ring 23 of bronze or other material, adapted to prevent gripping and secured, as to rotation, at the end, to the member 24 secured to propeller hub 7; and an external sleeve 25 which is centered by means of a friction ring 26 in the hub 7, and is secured by a flange 28 to the collar 11 of the member 3.

In the embodiment shown in Fig. 5, instead of using three rubber masses 5, 18, 19 as shown in Fig. 2, only two rubber rings 30, 31 having a substantially rectangular cross-section are inserted between the sleeve 3 and the cheeks 32, 33 secured to said sleeve on one hand and the internal and lateral faces of the propeller on the other hand.

In the embodiment shown in Fig. 6, between the propeller hub 8 and each of the two lateral cheeks 11 and 12 rotatable with the sleeve 3 and disposed symmetrically with relation to the median plane C—C of the propeller at right angles to the axis of shaft 1 and propeller 8, there is interposed a torus-shaped ring 60 or 61 disposed concentrically with respect to the driving shaft 1. Said torus-shaped ring has, when free, a substantially circular or oval cross-section, and is considerably compressed between the propeller hub 8 and the cheeks 11 and 12. Under the action of axial vibrations, the propeller may assume an inclined position on the driving shaft by causing the torus-shaped rings 60 and 61 to roll on their bearing surfaces on the propeller hub and on the cheeks 11 and 12. Moreover, if the propeller is not quite well balanced, it may be displaced in this case in a direction at right angles with the axis of the driving shaft.

Having now described my invention what I claim as new and desire to secure by Letters Patent is:

1. A connecting device between a driving shaft and a propeller comprising on said propeller two conical faces provided on either side of the hub of said propeller, and symmetrically disposed with relation to the median plane of the propeller hub at right angles to said driving shaft, the common axis of said conical faces coinciding with the axis of said shaft, a sleeve secured on said shaft and provided with two cheeks on either side of the hub of said propeller and symmetrically disposed with relation to said median plane of said propeller hub, each cheek having a conical face opposite and distant from the corresponding conical face on the hub of said propeller and the axis of said conical face coinciding with the axis of said shaft, and a mass of elastic material inserted with a considerable initial deformation on its whole extent between the conical face of each cheek and the corresponding conical face of the hub of the propeller.

2. A connecting device between a driving shaft and a propeller provided with a hub having a cylindrical central bore and two conical faces, symmetrically disposed on either side of the median plane of the propeller hub at right angles to said shaft, the common axis of said conical faces coinciding with the axis of said shaft, a sleeve secured on said shaft and provided with an intermediate cylindrical outer surface coaxial with said shaft and with said bore in said propeller and also provided with two cheeks symmetrically disposed on either side of the median plane of the propeller hub at right angles to said shaft, each cheek having a conical face opposite and distant from the corresponding conical face on the hub of said propeller and the axis of said conical face coinciding with the axis of said shaft, and yielding separating means between said shaft and said propeller consisting exclusively of masses of elastic material inserted with a considerable initial deformation on its whole extent between the conical face of each cheek and the corresponding conical face of the hub of the propeller and between said cylindrical outer surface of said sleeve and said cylindrical bore of said propeller hub.

3. A connecting device between a driving shaft and a propeller comprising on said propeller two conical faces provided on either side of the hub of said propeller, and symmetrically disposed with relation to the median plane of the propeller hub at right angles to said driving shaft, the common axis of said conical faces coinciding with the axis of said shaft, a sleeve secured on said shaft and provided with two cheeks on either side of the hub of said propeller and symmetrically disposed with relation to said median plane of said propeller hub, each cheek having a conical face opposite and distant from the corresponding conical face on the hub of said propeller and the axis of said conical face coinciding with the axis of said shaft, and a mass of elastic material having, when in its free state, the form of a torus-shaped ring with a circular cross section and inserted with a considerable initial deformation on its whole extent between the conical face of each cheek and the corresponding conical face of the hub of the propeller.

4. In combination, a driving shaft subject to variable torques about its axis, a propeller mounted on said shaft and subject to variable reaction torques about the axis of said shaft and also subject to variable axial thrusts and pulls, means on said shaft comprising a pair of annular faces which extend circumferentially about the axis of said shaft, said propeller being provided with a pair of complemental annular faces substantially axially spaced with respect to the first-mentioned faces and symmetrically arranged with respect to the axis of said shaft, annular bodies of resilient distortable material interposed between said cooperating faces, said bodies being of sufficient thickness to allow a substantial tilting of said propeller, said distortable material being in distorted condition and bonded to said faces whereby to establish a driving connection between said shaft and propeller and forming the sole means interconnecting said propeller with said shaft, said bodies of distortable material being generally symmetrically arranged axially with respect to the center of mass of said propeller whereby said propeller will be capable of limited, resiliently resisted oscillatory movement about its center of mass both circumferentially and axially with respect to said shaft.

5. In combination a driving shaft subject to variable torques about its axis, a propeller mounted on said shaft and subject to variable reaction torques about the axis of said shaft and also subject to variable axial thrusts and pulls, means on said shaft comprising a pair of annular faces which extend circumferentially about the axis of said shaft, said propeller being provided with a pair of complemental annular substantially axially spaced cooperating faces symmetrically arranged with respect to the axis of said shaft, said faces being generally inclined both with respect to the axis of said shaft and with respect to a plane perpendicular to the axis of said shaft and defining therebetween spaces generally symmetrically arranged with respect to the center of mass of said propeller, the space between said faces progressively increasing as the distance from the center of mass of said propeller is increased, bodies of resilient distortable material disposed in said spaces, said distortable material being in distorted condition and bonded to said faces whereby to establish a driving connection between said shaft and propeller and forming the sole means interconnecting said propeller with said shaft, said body of distortable material being generally symmetrically arranged axially with respect to the center of mass of said propeller whereby said propeller will be capable of limited resiliently resisted oscillatory movement about its center of mass both circumferentially and axially with respect to said shaft.

LEON THIRY.